United States Patent
Sasada et al.

(10) Patent No.: US 10,619,052 B2
(45) Date of Patent: Apr. 14, 2020

(54) IRON OXIDE DISPERSION FOR INK JET RECORDING, METHOD OF MANUFACTURING THE SAME, AND INK JET RECORDING METHOD

(71) Applicant: FUJIFILM CORPORATION, Minato-ku, Tokyo (JP)

(72) Inventors: Misato Sasada, Kanagawa (JP); Koji Naoe, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/904,452

(22) Filed: Feb. 26, 2018

(65) Prior Publication Data

US 2018/0179390 A1 Jun. 28, 2018

Related U.S. Application Data

(63) Continuation of application No. PCT/JP2016/078881, filed on Sep. 29, 2016.

(30) Foreign Application Priority Data

Sep. 30, 2015 (JP) ................ 2015-195138

(51) Int. Cl.

| | | |
|---|---|---|
| *B32B 5/16* | (2006.01) | |
| *C09C 1/24* | (2006.01) | |
| *C09C 3/10* | (2006.01) | |
| *C09D 11/322* | (2014.01) | |
| *C09C 3/08* | (2006.01) | |
| *C08L 33/14* | (2006.01) | |
| *C09D 11/107* | (2014.01) | |
| *C08K 9/08* | (2006.01) | |
| *C09D 11/326* | (2014.01) | |
| *C09D 133/14* | (2006.01) | |
| *C08L 33/00* | (2006.01) | |
| *C08K 3/22* | (2006.01) | |

(52) U.S. Cl.
CPC .............. *C09C 1/24* (2013.01); *C08K 9/08* (2013.01); *C08L 33/14* (2013.01); *C09C 3/08* (2013.01); *C09C 3/10* (2013.01); *C09D 11/107* (2013.01); *C09D 11/322* (2013.01); *C09D 11/326* (2013.01); *C09D 133/14* (2013.01); *C01P 2004/62* (2013.01); *C01P 2004/64* (2013.01); *C01P 2006/90* (2013.01); *C08K 2003/2265* (2013.01); *C08K 2201/001* (2013.01); *C08K 2201/003* (2013.01); *C08L 33/00* (2013.01)

(58) Field of Classification Search
CPC .............. C09D 11/38; C09D 11/322; Y10T 428/2991; Y10T 428/2998
USPC .................................. 428/403, 407
See application file for complete search history.

(56) References Cited

U.S. PATENT DOCUMENTS

| | | | |
|---|---|---|---|
| 4,107,063 A | 8/1978 | Kovac et al. | |
| 7,332,101 B2* | 2/2008 | Singh ............ | A61K 9/5094 252/62.51 C |
| 8,348,411 B2 | 1/2013 | Brust et al. | |
| 2002/0149656 A1* | 10/2002 | Nohr ............ | B41M 5/5218 347/95 |
| 2005/0176877 A1 | 8/2005 | Miyabayashi | |
| 2006/0063857 A1 | 3/2006 | Takahashi | |
| 2006/0205844 A1 | 9/2006 | Mizutani et al. | |
| 2009/0196831 A1* | 8/2009 | Yang ............ | A61K 49/0032 424/9.322 |
| 2011/0076404 A1* | 3/2011 | Brust ............ | C09D 11/322 427/256 |
| 2013/0005874 A1 | 1/2013 | Nakajima et al. | |
| 2013/0307899 A1 | 11/2013 | Saito et al. | |
| 2015/0005393 A1 | 1/2015 | Abiko et al. | |

FOREIGN PATENT DOCUMENTS

| | | |
|---|---|---|
| JP | H53-109706 A | 9/1978 |
| JP | 2006-028460 A | 2/2006 |
| JP | 2006-083341 A | 3/2006 |
| JP | 2006-328309 A | 12/2006 |
| JP | 2009-138021 A | 6/2009 |
| JP | 2013-203818 A | 10/2013 |
| JP | 2015-000968 A | 1/2015 |
| JP | 2015-78329 A | 4/2015 |
| JP | 2015-120927 A | 7/2015 |
| WO | 2011/114691 A1 | 9/2011 |

OTHER PUBLICATIONS

Translation JP 2006-028460 (2006) (Year: 2006).*
Extended European Search Report dated Jun. 22, 2018, issued in corresponding EP Patent Application No. 16851779.5.
International Search Report issued in International Application No. PCT/JP2016/078881 dated Oct. 25, 2016.
Written Opinion of the ISA issued in International Application No. PCT/JP2016/078881 dated Oct. 25, 2016.
"EUDRAGIT(R) RL 30D and EUDRAGIT(R) RS 30D," Evonik Nutrition & Care GmbH, Darmstadt, Germany, Jul. 2015, p. 1-7, retrieved from URL http://www.higuchiinc.co.jp/pharma/excipient/eudragit/pdf/detail_eudragitRL30D.pdf.
English language translation of the following: Office action dated Aug. 28, 2018 from the JPO in a Japanese patent application No. 2017-543580 corresponding to the instant patent application. This office action translation is submitted now in order to supplement the understanding of the cited references which are being disclosed in the instant Information Disclosure Statement.

(Continued)

*Primary Examiner* — Hoa (Holly) Le
(74) *Attorney, Agent, or Firm* — SOLARIS Intellectual Property Group, PLLC

(57) ABSTRACT

Provided are an iron oxide dispersion for ink jet recording, a method of manufacturing the same, and an ink jet recording method. The iron oxide dispersion for ink jet recording includes: iron oxide particles; a resin that has at least one of an amino group or a quaternary ammonium group and coats at least a part of surfaces of the iron oxide particles; and water, in which an average particle diameter of the iron oxide particles having surfaces at least a part of which are coated with the resin is 90 nm to 400 nm.

17 Claims, No Drawings

(56) References Cited

OTHER PUBLICATIONS

Office action dated Dec. 26, 2019, from the IPO in a Indian patent application No. 201847008391 corresponding to the instant patent application.

* cited by examiner

IRON OXIDE DISPERSION FOR INK JET RECORDING, METHOD OF MANUFACTURING THE SAME, AND INK JET RECORDING METHOD

CROSS-REFERENCE TO RELATED APPLICATION

This application is a continuation application of International Application No. PCT/JP2016/078881, filed Sep. 29, 2016, the disclosure of which is incorporated herein by reference in its entirety. Further, this application claims priority from Japanese Patent Application No. 2015-195138, filed Sep. 30, 2015, the disclosure of which is incorporated herein by reference in its entirety.

BACKGROUND OF THE INVENTION

1. Field of the Invention

The present disclosure relates to an iron oxide dispersion for ink jet recording, a method of manufacturing the same, and an ink jet recording method.

2. Description of the Related Art

In order to form an image, an ink or the like including a coloring material is used. In a case where the coloring material included in the ink or the like is insoluble or hardly soluble in water, in general, the coloring material is used in the form of a dispersion in which the coloring material is dispersed in water. As a method of forming an image, recently, various methods have been disclosed. From the viewpoint that an image can be simply recorded on various materials at a low cost in a non-contact manner, recently, an ink jet recording method has been widely used.

As the coloring material, a pigment and a dye are known in the related art, and a coloring material which is suitable for recording an image is selected according to the purpose and the like. For example, in the field of ink jet recording, a pigment and a dye can be used as a coloring material used for an ink. As a black pigment, for example, a carbon black pigment, magnetite, ferrite, or titanium black is disclosed (for example, refer to JP2009-138021A or JP2013-203818A).

For example, food products or medical products are ingestible. Therefore, in order to directly draw characters or pictures on food products or medical products, it is necessary that an ink or the like used for drawing characters or pictures is also ingestible. For example, in medical products, it is necessary that a certified ingestible material is used as a medical additive. Therefore, the kind of a coloring material that can be used for medical products is limited. In addition, among the coloring materials, a dye is suitable for preparing an aqueous coloring solution from the viewpoint of water solubility. On the other hand, it has been appointed that a dye is likely to be faded or discolored by light, humidity, and the like.

Therefore, for use in medical products that are not ingested immediately after being manufactured and is ingested after several years, it is desirable to select a pigment that is a certified material and is not likely to be faded or discolored. Not only for medical products but also for preserved food products, a coloring material having fastness such as a pigment is suitable. As the pigment, various kinds of inorganic pigments and organic pigments are present. However, the kinds of ingestible pigments that exhibit black are small. As a pigment that exhibits black, for example, a black iron oxide that is an inorganic pigment is widely known.

In addition, a technique of using dark brown squid ink particles to provide an ink composition having discoloration resistance, fading resistance, and stability as an edible ink is disclosed (for example, JP2015-78329A).

In addition, a dispersant for dispersing a pigment is also required to be selected from ingestible compounds for use in ingestible products. For example, hydroxypropyl cellulose or polyethylene glycol can be used.

SUMMARY OF THE INVENTION

Among iron oxides that are ingestible coloring materials, compounds that exhibit other colors other than black (for example, red (iron (III) oxide ($Fe_2O_3$)) or yellow (iron(III) oxide monohydrate ($Fe_2O_3.H_2O$))) are also present, but an iron oxide (iron(II,III) oxide ($Fe_3O_4$)) that exhibits black has a problem in that it has poorer dispersibility than iron oxides that exhibit colors other than black. Specifically, in a case where black iron oxide particles are attempted to be simply dispersed in water, it is difficult to stabilize dispersing, and it is difficult to stably disperse black iron oxide particles in water with a general dispersant that is certified to be harmless when ingested. In addition, depending on a dispersion specification or a dispersed state, the iron oxide particles may exhibit a color similar to brownish red without exhibiting black.

JP2009-138021A and JP2013-203818A disclose ferrite or the like as a pigment as described above and also describe a method of dispersing ferrite or the like using a dispersant. However, even in a case where iron oxide particles are simply dispersed using a dispersant and used as an ingestible coloring material, it is difficult to stably disperse the iron oxide particles in water while maintaining the original color of the dry iron oxide particles to some extent.

In addition, JP2015-78329A merely describes the technique of using squid ink and an edible pigment having a specific particle diameter to improve discoloration resistance, fading resistance, and stability. However, in the technique described in JP2015-78329A, in a case where iron oxide particles whose color is easily affected by dispersion conditions are dispersed, it is difficult to improve dispersion stability and jetting properties during jetting using an ink jet method while maintaining the color.

In addition, a dispersant used for dispersing is also limited in that it is necessary to select a compound, which can stably disperse an iron oxide and is suitable for maintaining the color of an iron oxide in a desirable range, from ingestible materials.

The present disclosure has been made in consideration of the above-described circumstances, and an object thereof is to provide: an iron oxide dispersion for ink jet recording that has excellent dispersion stability, exhibits a color in a range of black to brown, and has excellent jettability during jetting using an ink jet method; a method of manufacturing the same; and an ink jet recording method in which jettability during jetting using an ink jet method is excellent and in which an image that exhibits a color in a range of black to brown can be obtained.

Examples of the image include not only pictures of people, buildings, patterns, marks, and the like but also letters and numerical symbols.

Specific means for achieving the object include the following aspects.

<1> An iron oxide dispersion for ink jet recording comprising:
iron oxide particles;
a resin that has at least one of an amino group or a quaternary ammonium group and coats at least a part of surfaces of the iron oxide particles; and
water,
in which an average particle diameter of the iron oxide particles having surfaces at least a part of which are coated with the resin is 90 nm to 400 nm.

<2> The iron oxide dispersion for ink jet recording according to <1>,
in which the resin is an alkyl (meth)acrylate copolymer having a quaternary ammonium group.

<3> The iron oxide dispersion for ink jet recording according to <1> or <2>,
in which an average particle diameter of the iron oxide particles having surfaces at least a part of which are coated with the resin is 90 nm to 280 nm.

<4> The iron oxide dispersion for ink jet recording according to <1> or <2>,
in which an average particle diameter of the iron oxide particles having surfaces at least a part of which are coated with the resin is 100 nm to 200 nm.

<5> The iron oxide dispersion for ink jet recording according to any one of <1> to <4>,
in which an iron oxide of the iron oxide particles is iron(II,III) oxide.

<6> The iron oxide dispersion for ink jet recording according to any one of <1> to <5>,
in which the resin includes a structural unit derived from at least one monomer selected from the group consisting of methyl (meth)acrylate and ethyl (meth)acrylate and a structural unit derived from chlorinated trimethylammoniumethyl (meth)acrylate.

<7> The iron oxide dispersion for ink jet recording according to any one of <1> to <6>,
in which a zeta potential of the iron oxide particles having surfaces at least a part of which are coated with the resin is 20 mV to 50 mV, the zeta potential being measured under conditions of pH 5 and 25° C.

<8> The iron oxide dispersion for ink jet recording according to any one of <1> to <7>,
in which a mass ratio of a content A of the resin to a content B of the iron oxide particles is in a range that satisfies the following Expression 1, $0.3 \leq A/B \leq 0.8$  Expression 1.

<9> The iron oxide dispersion for ink jet recording according to any one of <1> to <7>,
in which a mass ratio of a content A of the resin to a content B of the iron oxide particles is in a range that satisfies the following Expression 2, $0.3 \leq A/B \leq 0.7$  Expression 2.

<10> The iron oxide dispersion for ink jet recording according to any one of <1> to <7>,
in which a mass ratio of a content A of the resin to a content B of the iron oxide particles is in a range that satisfies the following Expression 3, $0.4 \leq A/B \leq 0.6$  Expression 3.

<11> A method of manufacturing an iron oxide dispersion for ink jet recording, the method comprising:
a mixing step of mixing iron oxide particles, a resin that has at least one of an amino group or a quaternary ammonium group, and water with each other; and
a dispersion preparation step of dispersing the iron oxide particles in water in the presence of the resin that has at least one of an amino group or a quaternary ammonium group to prepare an iron oxide dispersion in which iron oxide particles having surfaces at least a part of which are coated with the resin and having an average particle diameter of 90 nm to 400 nm are dispersed.

<12> The method of manufacturing an iron oxide dispersion for ink jet recording according to <11>,
in which the dispersion preparation step includes a first dispersing step of dispersing the iron oxide particles in water using first dispersing media and a second dispersing step of further dispersing the iron oxide particles dispersed in the first dispersing step using second dispersing media having a smaller medium diameter than the first dispersing media.

<13> The method of manufacturing an iron oxide dispersion for ink jet recording according to <12>,
wherein a ratio of the medium diameter of the first dispersing media to the medium diameter of the second dispersing media is 5 times to 50 times.

<14> The method of manufacturing an iron oxide dispersion for ink jet recording according to any one of <11> to <13>,
in which a zeta potential of the iron oxide particles having surfaces at least a part of which are coated with the resin is 20 mV to 50 mV, the zeta potential being measured under conditions of pH 5 and 25° C.

<15> An ink jet recording method comprising:
jetting the iron oxide dispersion for ink jet recording according to any one of <1> to <10> using an ink jet method to record an image.

According to the present disclosure, it is possible to provide: an iron oxide dispersion for ink jet recording that has excellent dispersion stability, exhibits a color in a range of black to brown, and has excellent jettability during jetting using an ink jet method; a method of manufacturing the same; and an ink jet recording method in which jettability during jetting using an ink jet method is excellent and in which an image that exhibits a color in a range of black to brown can be obtained.

DESCRIPTION OF THE PREFERRED EMBODIMENTS

Hereinafter, an iron oxide dispersion for ink jet recording, a method of manufacturing the same, and an ink jet recording method according to the present disclosure will be described in detail.

In this specification, numerical ranges represented by "to" include numerical values before and after "to" as minimum values and maximum values.

In addition, in this specification, "(meth)acryl" represents at least one of methacryl or acryl, and "(meth)acrylate" represents at least one of acrylate or methacrylate.

<Iron Oxide Dispersion for Ink Jet Recording>

The iron oxide dispersion for ink jet recording according to the present disclosure includes: iron oxide particles; a resin that has at least one of an amino group or a quaternary ammonium group and coats at least a part of surfaces of the iron oxide particles; and water, in which an average particle diameter of the iron oxide particles having surfaces at least a part of which are coated with the resin is 90 nm to 400 nm.

In the dispersion according to the present disclosure, the iron oxide particles are dispersed in a dispersion medium including water. It is presumed that, due to an electrostatic interaction between the black iron oxide and the amino group and the quaternary ammonium group, the resin is likely to be adsorbed on the iron oxide particles, a charge repulsion occurs between the iron oxide particles coated with resin, and stable dispersing can be performed.

In the related art, a pigment or a dye is known as a coloring material. Among these, a coloring material suitable for the purpose and the like is selected, and an iron oxide is also widely known as an inorganic pigment. Among many coloring materials, for example, an ingestible dye may be used as a coloring component for drawing characters on an ingestible material. From the viewpoint of being added to an ingestible material and ingested by a person, a dye that is soluble in water and with which an aqueous coloring solution can be prepared is suitable for use as a coloring material. From this viewpoint, it can be said that a dye is more practical than a pigment. However, in general, a dye is likely to be faded or discolored by light, humidity, and the like, and has a problem in that it is not suitable for uses, such as medical products, in which a storage period is relatively long. Therefore, a pigment that is not likely to cause fading or discoloration is desired, but the kinds of ingestible pigments that exhibit black are small.

Known examples of an inorganic pigment that exhibits black include a black iron oxide ($Fe_3O_4$).

In a case where the black iron oxide is attempted to be dispersed in an aqueous medium, dispersing is difficult. Therefore, depending on a dispersion specification (for example, the kind of a dispersant or a particle diameter of dispersed particles), black iron oxide particles may precipitate without being completely dispersed, or the color of black iron oxide particles may not be maintained in a range of dark brown to brown, let alone black, such that only a red dispersion is obtained in some cases. Further, the black iron oxide particles become yellow. That is, in general, iron oxide particles (black iron oxide) that exhibit black cannot be maintained to be black, which is the original color of the dry particles, during dispersing and is discolored from black to blackish brown (dark brown). Depending on a dispersed state, the iron oxide particles tend to be discolored from dark brown to brown and further discolored to a color similar to red.

In the present disclosure, in consideration of the above-described circumstances, a dispersant suitable for dispersing black iron oxide particles is selected, and appropriate dispersion conditions are selected. In order to obtain a dispersion in which the color is maintained in a range of black, which is the original color of black iron oxide, to brown, black iron oxide is dispersed using a specific dispersant under precise dispersion conditions (conditions where the black iron oxide is dispersed neither excessively nor insufficiently) such that the dispersed state of the black iron oxide is well-balanced. Specifically, a resin having at least one of an amino group or a quaternary ammonium group is used as a dispersant for dispersing iron oxide particles, and an average particle diameter of particles coated with the resin is adjusted to satisfy a specific range.

As a result, the obtained dispersion exhibits stable dispersibility while exhibiting a color in a range of black to brown, and can exhibit excellent jettability during jetting using an ink jet method. From this viewpoint, regarding other dispersion conditions, it is preferable that a zeta potential of the particles coated with the resin satisfies a specific range. By adjusting the zeta potential to be in the specific range, the dispersibility and the jettability are further improved.

"Precise dispersion conditions (conditions where the black iron oxide is dispersed neither excessively nor insufficiently)" described above refer to conditions where the average particle diameter can be adjusted to satisfy the specific range using the specific dispersant.

In this specification, "the color in a range of black to brown" represents a color in a range of black to brown including dark brown.

Hereinafter, the components included in the iron oxide dispersion for ink jet recording according to the present disclosure will be described in detail.

—Iron Oxide Particles—

The iron oxide dispersion for ink jet recording according to the present disclosure includes at least one kind of iron oxide particles. The iron oxide particles according to the present disclosure refer to particles of iron oxide that exhibits black (hereinafter, also referred to as "black iron oxide") in the form of dry powder. In the present disclosure, as described below, the iron oxide particles that exhibit black (hereinafter, also referred to as "black iron oxide particles") are dispersed using the specific resin to satisfy the specific dispersion conditions (the average particle diameter, preferably, the average particle diameter and the zeta potential). As a result, the iron oxide particles are present as a dispersoid that exhibits a color in a range of black to brown in the dispersion.

The iron oxide of the iron oxide particles in the present disclosure is an iron oxide that exhibits black in the form of dry powder, and includes iron(II,III) oxide ($Fe_3O_4$) as a major component. Taking a plurality of compositions of iron oxide into consideration, "major component" represents that the content of $Fe_3O_4$ is 50 mass % or higher with respect to the total amount of the iron oxide. In particular, the content of $Fe_3O_4$ with respect to the total amount of the iron oxide is preferably 80 mass % or higher, more preferably 90 mass % or higher, and still more preferably 95 mass % or higher. As the iron oxide, a black iron oxide that is commercially available for use as medical products may be used.

The iron oxide particles according to the present disclosure are dispersed after being mixed with the resin described below. As a result, the iron oxide particles are dispersed and present in the dispersion as resin-coated iron oxide particles having surfaces at least a part of which are coated with the resin.

By controlling the dispersed state such that the resin-coated iron oxide particles have the specific average particle diameter (preferably the specific average particle diameter and the zeta potential), the iron oxide particles can be dispersed in a state where they exhibit a color in a range of black to brown.

The iron oxide particles having surfaces at least a part of which are coated with the resin have an average particle diameter of 90 nm to 400 nm. By adjusting the average particle diameter to be 90 nm or more, the color of the dispersed iron oxide particles can be maintained in a range of brown to black. In addition, as the average particle diameter increases, the color becomes similar to black and is improved, but dispersion stability and jettability during jetting using an ink jet method are likely to deteriorate. Accordingly, by adjusting the average particle diameter to be 400 nm or less, a color similar to black can be obtained while maintaining excellent dispersion stability and jettability during jetting using an ink jet method.

The average particle diameter of the iron oxide particles is preferably 90 nm to 280 nm and more preferably 100 nm to 200 nm from the viewpoint of further improving dispersion stability and ink jettability while maintaining the color in a range of black to brown.

In addition, from the viewpoint of making the color of the dispersed iron oxide particles more similar to black, the average particle diameter of the iron oxide particles is preferably 200 nm to 400 nm and more preferably 250 nm to 350 nm.

From the viewpoint of obtaining a good balance between the dispersion stability, the color, the jettability during jetting using an ink jet method, the average particle diameter of the iron oxide particles is preferably 100 nm to 200 nm, more preferably 100 nm to 180 nm, and still more preferably 100 nm to 150 nm.

The average particle diameter is the average particle diameter of the iron oxide particles having surfaces at least a part of which are coated with the resin, and is obtained using the following method. That is, in order to obtain the average particle diameter, a dispersion including at least the iron oxide and the resin is prepared, and the prepared dispersion is diluted to 100 times with ion exchange water to obtain a dilute solution. Using ZETASIZER NANO ZS (manufactured by Spectris), particle diameters of particles in the dilute solution are obtained using a dynamic light scattering method and are analyzed using the cumulants method. As a result, an average particle diameter (Z-average. (d.nm): also referred to as "average cumulant diameter") that is a hydrodynamic diameter is obtained.

In addition, as the iron oxide particles that are not coated with the resin by dispersing, particles having a predetermined particle diameter distribution that is obtained, for example, by crushing raw material powder can also be used.

An average particle diameter of the iron oxide particles that are not coated with the resin by dispersing is not particularly limited, and an average primary particle diameter thereof is, for example, 500 nm or less and preferably 300 nm or less. In addition, the average primary particle diameter of the iron oxide particles is preferably 10 nm or more and more preferably 50 nm or more.

In a case where the average primary particle diameter is 500 nm or less, the average particle diameter of the dispersed particle in the iron oxide dispersion for ink jet recording is in the above-described range. In addition, in a case where the average primary particle diameter is 10 nm or more and preferably 50 nm or more, handleability during preparation of the iron oxide dispersion is excellent.

The average primary particle diameter can be obtained by measuring equivalent circle diameters of 400 or more iron oxide particles with a transmission electron microscope (TEM) or a scanning electron microscope (SEM) and obtaining an arithmetic average (number average value) of the measured values. The equivalent circle diameter refers to a diameter of a circle having the same area as that of a two-dimensional shape of an iron oxide particle to be observed.

In addition, it is preferable that a zeta potential of the iron oxide particles having surfaces at least a part of which are coated with the resin is 20 mV to 50 mV, the zeta potential being measured under conditions of pH 5 and 25° C. The zeta potential represents an overall potential of the iron oxide particles coated with the resin.

By adjusting the zeta potential to be 20 mV or higher, a repulsion force between the particles is generated, and aggregation of the particles is suppressed. Therefore, dispersion stability is further improved, and ink jettability during jetting using an ink jet method is also improved.

From the viewpoint of the dispersion stability of the dispersed iron oxide particles, the zeta potential is preferably 20 mV to 50 mV and more preferably 30 mV to 50 mV.

The pH of water is a value measured at 25° C. using a pH meter WM-50EG (manufactured by DKK-TOA Corporation).

The zeta potential is a value measured under conditions of pH 5 and 25° C. in an aqueous solution in which the water content is 95 mass % or higher. In this case, the total concentration of the resin, a surfactant, and additives in the aqueous solution is adjusted to be lower than 0.2 mass %. In addition, it is preferable that the concentration of the black iron oxide is adjusted to be 0.0001 mass % to 0.1 mass %.

In the measurement of the zeta potential, for example, the prepared iron oxide dispersion for ink jet recording is diluted such that the concentration of the black iron oxide satisfies the above-described range, and the dilute solution is adjusted to have properties of a temperature of 25° C. and pH 5 using an acid aqueous solution or a sodium hydroxide aqueous solution. Alternatively, the dispersed particles (the iron oxide particles coated with the resin) separated from the prepared iron oxide dispersion for ink jet recording are added to an aqueous solution adjusted to have properties of a temperature of 25° C. and pH 5 such that the concentration of the black iron oxide is in the above-described range.

The zeta potential is the zeta potential ($\xi$) of the iron oxide particles having surfaces at least a part of which are coated with the resin, and is obtained using the following method. That is, in order to obtain the zeta potential, a dispersion including at least the iron oxide and the resin is prepared, and the prepared dispersion is diluted with ion exchange water as described above such that the concentration of the black iron oxide is in the above-described range. Further, the dilute solution is adjusted to have properties of 25° C. and pH 5 using an acidic compound or a basic compound. Next, an average potential (mV) of the dilute solution for measurement adjusted to 25° C. was measured by electrophoretic light scattering using ZETASIZER NANO ZS (manufactured by Spectris).

In this case, for example, acetic acid is used as the acidic compound, and sodium hydroxide is used as the basic compound.

The zeta potential can be adjusted, for example, by changing the kind and amount of the dispersant that coats at least a part of the surfaces of the dispersed particles or changing the particle diameter of the dispersed particles in the dispersed state.

The content of the iron oxide particles in the iron oxide dispersion for ink jet recording is preferably 0.5 mass % to 5 mass % and more preferably 1 mass % to 3 mass % with respect to the total amount of the iron oxide dispersion for ink jet recording. In a case where the content of the iron oxide particles is 0.5 mass % or higher, a color density suitable for forming an image is likely to be obtained. In a case where the content of the iron oxide particles is 5 mass % or lower, dispersing is likely to be stable, and a viscosity suitable for jetting ink using an ink jet method is likely to be obtained.

For example, from the viewpoint of adjusting the color to be black or a color similar to black, the iron oxide dispersion for ink jet recording according to the present disclosure can also be used optionally in combination with oxide particles other than the black iron oxide within a range where the effects of the present disclosure do not deteriorate.

—Resin—

The iron oxide dispersion for ink jet recording according to the present disclosure includes at least one resin having at least one of an amino group or a quaternary ammonium group.

At least a part of surfaces of the iron oxide particles are coated with the resin having at least one of an amino group or a quaternary ammonium group such that the iron oxide particles are stably dispersed. As a result, jettability of the dispersion during ink jetting using an ink jet method is improved. It is presumed that the amino group and the quaternary ammonium group are likely to be adsorbed on the surfaces of the black iron oxide particles due to an electrostatic interaction with the black iron oxide surface and a hydrogen bonding interaction. In particular, it is presumed that the quaternary ammonium group has a strong adsorption force on the surfaces of the black iron oxide particles due to an electrostatic interaction with the surfaces of the black iron oxide particles. In addition, it is presumed that a charge repulsion occurs between the coated iron oxide particles, and an effect of stabilizing dispersing is high. Therefore, it is preferable that the quaternary ammonium group is used. That is, in a case where the iron oxide particles are dispersed, that is, at least a part of the surfaces of the iron oxide particles are coated with the resin, the quaternary ammonium group is suitable for adjusting the average particle diameter to be 90 nm to 400 nm (preferably, adjusting the zeta potential to be 20 mV to 50 my under conditions of pH 5 and 25° C.).

As the resin, a compound suitable for dispersing the iron oxide particles (adjusting the average particle diameter (preferably the average particle diameter and the zeta potential) to be in the above-described ranges) may be selected from resins having at least one of an amino group or a quaternary ammonium group. As the resin, a resin which is not generally used as a dispersion resin may also be used. For example, a resin which is used as a coating agent for medical products may also be used.

The amino group refers to any monovalent functional group obtained by removing a hydrogen atom from ammonia, primary amine, or secondary amine.

It is preferable that the quaternary ammonium group is a quaternary ammonium cation or a quaternary ammonium salt.

The resin having an amino group or the resin having a quaternary ammonium group may be a copolymer of plural kinds of monomers. In a case where each of the resin having an amino group or the resin having a quaternary ammonium group is a copolymer, the copolymer may be obtained by copolymerization of monomers selected from the group consisting of (meth)acrylic acid ester, alkylammonium (meth)acrylate, and dimethylaminoethyl methacrylate.

Specific examples of the monomers used for preparing the resin include: an alkyl (meth)acrylate such as methyl (meth) acrylate, ethyl (meth)acrylate, n-propyl (meth)acrylate, or n-butyl (meth)acrylate; and a salt of trimethylammonium ethyl acrylate or trimethylammonium ethyl methacrylate, a salt of triethylammonium ethyl acrylate or triethylammonium ethyl methacrylate, or dimethylaminoethyl methacrylate.

Examples of the resin having an amino group include gelatin and an aminoalkyl methacrylate copolymer.

Examples of a commercially available product of the aminoalkyl methacrylate copolymer include EUDRAGIT E100 and EUDRAGIT EPO (manufactured by Evonik Degussa Corporation; a methyl methacrylate/butyl methacrylate/dimethylaminoethyl methacrylate copolymer).

Examples of the gelatin include an acid-treated gelatin and an alkali-treated gelatin. As the resin for coating the iron oxide, an alkali-treated gelatin is preferable. In addition, examples of a commercially available product of the gelatin include an alkali-treated gelatin (manufactured by Nitta Gelatin Inc.).

As the resin having a quaternary ammonium group, a (meth)acrylic copolymer having a quaternary ammonium group is preferable, and an alkyl (meth)acrylate copolymer (ammonioalkyl (meth)acrylate copolymer) having a quaternary ammonium group is more preferable.

As the alkyl (meth)acrylate copolymer (ammonioalkyl (meth)acrylate copolymer) having a quaternary ammonium group, a copolymer including at least a structural unit derived from alkyl (meth)acrylate and a structural unit derived from alkylammonium (meth)acrylate is preferable, and a copolymer including a structural unit derived from at least one monomer selected from the group consisting of methyl (meth)acrylate and ethyl (meth)acrylate and a structural unit derived from chlorinated trimethylammoniumethyl (meth)acrylate is more preferable.

Specific examples of the alkyl (meth)acrylate copolymer having a quaternary ammonium group include an ethyl acrylate/methyl methacrylate/chlorinated trimethylammonium ethyl methacrylate copolymer. In addition, examples of a commercially available product include EUDRAGIT RLPO, EUDRAGIT RSPO, EUDRAGIT RL100, EUDRAGIT RL30D, EUDRAGIT RS100, and EUDRAGIT RS30D (all of which are manufactured by Evonik Degussa Corporation).

Among the resins having a quaternary ammonium group, an ethyl acrylate/methyl methacrylate/chlorinated trimethylammonium ethyl methacrylate copolymer is more preferable.

It is preferable that the resin having an amino group or the resin having a quaternary ammonium group has a solubility of 3 g or lower in 100 g of water at 40° C. During dispersing, the resin is adsorbed on the surfaces of the black iron oxide particles such that the black iron oxide particles can be stably dispersed. By using the resin having a low solubility in water, the desorption of the resin from the black iron oxide particles to water is likely to be suppressed. Therefore, the black iron oxide particles are not likely to reaggregate, and dispersion stability is imparted thereto. The resin having an amino group or the resin having a quaternary ammonium group may have water swelling properties and may swell in water.

The content of the resin in the iron oxide dispersion for ink jet recording is preferably 0.1 mass % to 5 mass %, more preferably 0.5 mass % to 3 mass %, and still more preferably 0.5 mass % or higher and lower than 2 mass % with respect to the total amount of the iron oxide dispersion for ink jet recording.

In addition, in the above-described range, it is preferable that a ratio (ratio A/B; mass ratio) of a content A of the resin to a content B of the iron oxide particles is in a range that satisfies the following Expression 1.

$$0.3 \leq A/B \leq 0.8 \qquad \text{Expression 1}$$

The content A of the resin refers to the total content of the resin that coats the iron oxide particles and the resin that is free in the dispersion without coating the iron oxide particles in the iron oxide dispersion for ink jet recording.

In a case where the ratio A/B in Expression 1 is 0.3 or higher, the amount of the resin with respect to the amount of the iron oxide particles is not excessively small, and thus dispersing is favorably performed. Accordingly, the average particle diameter of the iron oxide particles is likely to be adjusted to be in a range of 400 nm or less where the favorable color (a color in a range of black to brown) is likely to be obtained, and dispersion stability and ink jettability are also excellent.

In addition, as the amount of the resin increases, the particle diameter of the dispersed particles decreases, but dispersing tends to be difficult. Therefore, by suppressing the ratio A/B to be 0.8 or lower, the amount of the resin with respect to the amount of the iron oxide particles is not excessively large. Therefore, dispersing is likely to be favorably performed without being delayed. Accordingly, dispersion stability and ink jettability are also excellent.

In the present disclosure, due to the above-described reasons, it is more preferable that the ratio A/B satisfies the following Expression 2, and it is more preferable that the ratio A/B satisfies the following Expression 3.

$$0.3 \leq A/B \leq 0.7 \quad \text{Expression 2}$$

$$0.4 \leq A/B \leq 0.6 \quad \text{Expression 3}$$

—Water—

The iron oxide dispersion for ink jet recording according to the present disclosure includes water as a dispersion medium.

Water functions as a dispersion medium for the iron oxide particles. It is preferable that water is used as a dispersion medium from the viewpoint of obtaining high safety. As the water, for example, ion exchange water, water having a purity equivalent to ion exchange water, or pure water can be used.

In addition, the iron oxide dispersion for ink jet recording may include a solvent (for example, an organic solvent) other than water within a range where the effects of the present disclosure do not deteriorate.

The content of water in the iron oxide dispersion for ink jet recording is not particularly limited, and from the viewpoint of improving storage stability of the iron oxide dispersion for ink jet recording, is preferably 15 mass % to 88 mass %, more preferably 20 mass % to 75 mass %, and still more preferably 25 mass % to 55 mass % with respect to the total amount of the iron oxide dispersion for ink jet recording.

The iron oxide dispersion for ink jet recording according to the present disclosure has excellent dispersion stability, and thus the dispersed state of the particles is not likely to deteriorate over time after dispersing. Therefore, the iron oxide dispersion for ink jet recording is suitable for ink jet recording. In a case where the iron oxide dispersion for ink jet recording is used for ink jet recording, jettability is excellent.

Regarding the iron oxide dispersion for ink jet recording according to the present disclosure, the prepared iron oxide dispersion may be used as an ink jet recording ink composition without any change. In addition, the iron oxide dispersion for ink jet recording according to the present disclosure may be used as an ink jet recording ink composition after adding components other than the above-described components thereto.

In a case where the iron oxide dispersion for ink jet recording according to the present disclosure is used for ink jet recording, the other components which may be further added to the iron oxide dispersion for ink jet recording can be selected from ingestible compounds. As the other components, for example, well-known edible additives can be used among a coloring material other than iron oxide, a water-soluble organic solvent, a polymer component, a surfactant, a chelating agent, a fungicide, an emulsion stabilizer, an antifading agent, a ultraviolet absorber, a preservative, a pH adjuster, a surface tension adjuster, an antifoaming agent, a viscosity adjuster, a dispersion stabilizer, and the like.

The coloring material other than iron oxide is not particularly limited as long as it is an edible coloring material, and can be selected from a well-known synthetic edible colorant and a well-known natural edible colorant. As the synthetic edible colorant or the natural edible colorant, a coloring material described in paragraphs "0013" and "0014" of JP2015-3883A can be appropriately selected and used.

Examples of the water-soluble organic solvent include an edible alcohol such as propylene glycol or glycerin. Among these, propylene glycol or glycerin is preferable as the aqueous organic solvent from the viewpoint of easy availability and excellent moisture retention.

In a case where the aqueous organic solvent is added, the addition amount of the aqueous organic solvent is preferably 0.5 mass % to 40 mass % and more preferably 5 mass % to 20 mass % with respect to the total amount of the iron oxide dispersion for ink jet recording.

The polymer component is not particularly limited as long as it is edible, and a natural resin is preferable. Examples of the natural resin include palms. Examples of other resin components include hydroxypropyl cellulose, methyl cellulose, polyethylene glycol, and beat saponin silanol.

In a case where the polymer component is added, the addition amount of the polymer component is preferably 0.3 mass % to 15 mass % with respect to the total amount of the iron oxide dispersion for ink jet recording.

The surfactant can adjust the surface tension of the iron oxide dispersion for ink jet recording to be in an appropriate range, and can improve jettability during jetting using an ink jet method.

Examples of the surfactant include succinic acid monoglyceride, soybean saponin, erythritol, polyglycerin, a fatty acid ester, Quillaja saponin, barium chloride hydrate, a propylene glycol fatty acid ester, lecithin, enzymatically modified lecithin, a glycerin fatty acid ester, organic acid monoglyceride, a sucrose fatty acid ester, and a sorbitan fatty acid ester.

Examples of the sorbitan fatty acid ester include a polysorbate obtained by condensing sorbitan fatty acid ester with about 20 molecules of ethylene oxide (polyoxyethylene ether of sorbitan fatty acid ester). Examples of the polysorbate include polysorbate 20 (lauric acid ester), polysorbate 60 (stearic acid ester), polysorbate 80 (oleic acid ester), and polysorbate 65 (stearic acid ester) which are different from each other in fatty acid.

In a case where the surfactant is added, the addition amount of the surfactant is preferably 0.01 mass % to 3.0 mass % with respect to the total amount of the iron oxide dispersion for ink jet recording.

Further, the following edible additives may be added.

Examples of the edible additives include flavonoids, propylene glycol laurate, polyvinyl, rosemaries, propylene glycol dioleate, glycerin acetic acid esters, AEROSIL, disodium hydrogenphosphate, stearyl monoglyceridyl, citric acid esters, tetrasodium pyrophosphate, sodium polyphosphate, guar gum, amylopectin, pectin, tamarind gum, xanthane gum, potassium metaphosphate, enzymatically modified soybean saponin, animal sterol, carboxymethylcellulose sodium, and citric acid. Among these additives, one kind may be used alone, or plural kinds may be used in combination.

The pH (25° C.) of the iron oxide dispersion for ink jet recording is not particularly limited and, from the viewpoint of further improving dispersion stability of the iron oxide particles, is preferably 9 or lower and more preferably 7 or lower and is preferably 4 or higher and 5 or higher.

The pH is a value measured at 25° C. using a pH meter WM-50EG (manufactured by DKK-TOA Corporation).

<Method of Manufacturing Iron Oxide Dispersion for Ink Jet Recording>

A method of manufacturing the iron oxide dispersion for ink jet recording according to the present disclosure includes: a mixing step of mixing iron oxide particles, a resin that has at least one of an amino group or a quaternary ammonium group, and water with each other; and a dispersion preparation step of dispersing the iron oxide particles in water in the presence of the resin that has at least one of an amino group or a quaternary ammonium group to prepare an iron oxide dispersion in which iron oxide particles having surfaces at least a part of which are coated with the resin and having an average particle diameter of 90 nm to 400 nm are dispersed. Optionally, the method of manufacturing the iron oxide dispersion for ink jet recording according to the present disclosure may further include other steps.

In the method of manufacturing the iron oxide dispersion for ink jet recording according to the present disclosure, the iron oxide particles are dispersed in water in the presence of the resin that has at least one of an amino group or a quaternary ammonium group such that the average particle diameter (preferably the average particle diameter and the zeta potential) of the iron oxide particles in the dispersed state are adjusted to be in the specific range. As a result, stable dispersibility can be obtained, a color in a range of black to brown is exhibited, and jettability during jetting using an ink jet method is excellent.

—Mixing Step—

In the mixing step according to the present disclosure, iron oxide particles, a resin that has at least one of an amino group or a quaternary ammonium group, and water are mixed with each other. In a case where the iron oxide dispersion for ink jet recording is used as, for example, an ink jet recording ink, not only the iron oxide particles, the resin having at least one of an amino group or a quaternary ammonium group, and water but also other additives may be mixed with each other.

The mixing amounts of the respective components can be adjusted in consideration of the amounts included in the iron oxide dispersion for ink jet recording.

A mixing method is not particularly limited as long as plural components can be mixed with each other.

—Dispersion Preparation Step—

In the dispersion preparation step according to the present disclosure, the iron oxide particles are dispersed in water in the presence of the resin that has at least one of an amino group or a quaternary ammonium group. In this step, at least a part of surfaces of the dispersed iron oxide particles are coated with the resin. As a result, the iron oxide dispersion in which the iron oxide particles having an average particle diameter of 90 nm to 400 nm are dispersed is prepared.

It is preferable that the zeta potential of the dispersed iron oxide particles measured under conditions of pH 5 and 25° C. is 20 mV to 50 mV In this step, by controlling the dispersion conditions of the iron oxide particles in the presence of the resin that has at least one of an amino group or a quaternary ammonium group, the iron oxide dispersion in which dispersion stability and jettability during jetting using an ink jet method are excellent while maintaining the color in a range of black to brown can be obtained. The dispersion conditions can be adjusted by adjusting the volume average particle diameter and the zeta potential of the iron oxide particles, which are dispersed in the resin having at least one of an amino group or a quaternary ammonium group, to be in the above-described ranges and by changing the kind and amount of the dispersant during dispersing, performing multi-step dispersing in multiple steps, or changing a medium diameter, a dispersion time, and the like.

For dispersing, a dispersing method using dispersing media is used. For example, a method using a mill (for example, a beads mill, a ball mill, a tower mill, or a triple roll mill) can be used.

In particular, from the viewpoint of further improving dispersibility of the iron oxide particles, a method using a ball mill or a beads mill (in particular, a circulation type beads mill) is preferable, and a method using a ball mill is more preferable.

The dispersing media are used for dispersing a dispersion target material, and grains called beads having a size of about 0.03 mm to 2.0 mm can be used. For example, well-known dispersing media such as glass beads or zirconia beads can be appropriately selected. Hereinafter, the dispersing media will also be referred to as "beads".

In the case of spherical media (for example, spherical beads), "medium diameter" refers to a diameter of media (for example, beads). In the case of non-spherical media (non-spherical beads), "medium diameter" refers to a diameter obtained by measuring equivalent circle diameters of a plurality of media (for example, beads) based on an observed image of a transmission electron microscope (TEM) or a scanning electron microscope (SEM) and obtaining an arithmetic average of the measured values. The equivalent circle diameter refers to a diameter of a circle having the same area as that of a two-dimensional shape of an iron oxide particle to be observed.

It is preferable that the dispersion preparation step is performed by multi-step dispersing that is a combination of multiple steps having different dispersion conditions. By performing the multi-step dispersing, the desired average particle diameter (preferably the average particle diameter and the zeta potential) are likely to be adjusted to be in the above-described range, and excellent ink jettability is likely to be obtained.

In a case where the iron oxide dispersion is prepared by the multi-step dispersing, it is preferable that the dispersion preparation step includes: a first dispersing step of dispersing the iron oxide particles in water using first dispersing media; and a second dispersing step of further dispersing the iron oxide particles dispersed in the first dispersing step using second dispersing media having a smaller medium diameter than the first dispersing media. That is, beads having a relatively large diameter are used for dispersing in the initial dispersing step (first dispersing step), and then the medium diameter is reduced to be less than that of the first dispersing media in the second dispersing step.

In the dispersion preparation step, the iron oxide dispersion may be prepared by performing the multi-step dispersing of dispersing the iron oxide particles multiple times under different dispersion conditions. For example, two-step dispersing of dispersing the iron oxide particles two times under two different dispersion conditions or three-step dispersing of dispersing the iron oxide particles three times under three different dispersion conditions is preferable.

In the case of the multi-step dispersing, in the initial first dispersing step, a dispersed particle in which the particle diameter of dispersed particles does not significantly decrease is formed using relatively large beads. In the next dispersing step, a stable dispersed state can be formed while controlling the particle diameter.

The rotation speed during dispersing may be appropriately selected according to a device to be used. For example, in the case of a ball mill, the container rotation speed (preferably the rotation speed of an outer edge portion of the container) is preferably 100 rpm to 500 rpm and more preferably 100 rpm to 250 rpm.

In the case of two-step dispersing, it is preferable that a ratio of the medium diameter of the first dispersing media used in the first dispersing step to the medium diameter of the second dispersing media used in the second dispersing step is 5 times to 50 times. Here, in a case where the ratio is 5 times or more, the particle diameter is not excessively reduced, and the dispersing effect of the second dispersing step also works. As a result, dispersion stability and ink jettability are excellent while maintaining the color in a range of black to brown. From this viewpoint, it is preferable that the ratio is 5 times or more. In addition, in a case where the ratio is 50 times or less, the medium diameter of the first dispersing media is not excessively large. Therefore, in the initial first dispersing step, dispersing is likely to be favorably performed, and an excessive decrease in particle diameter caused by an excessively small medium diameter of the second dispersing media can also be suppressed. From this viewpoint, it is preferable that the ratio is 50 times or less.

From the viewpoint of easily adjusting the iron oxide particles to haven appropriate particle diameter for obtaining an excellent color and excellent dispersion stability, the ratio of the medium diameter of the first dispersing media to the medium diameter of the second dispersing media is more preferably 5 times to 20 times and more preferably 5 times to 15 times.

In addition, in the case of single-step dispersing, the medium diameter of dispersing media used for dispersing is preferably 0.1 mm to 2 mm (more preferably 0.5 mm to 1 mm).

In the case of two-step dispersing, the medium diameter of the first dispersing media used for dispersing in the initial first dispersing step is preferably 0.5 mm to 2 mm (more preferably 0.8 mm to 1.5 mm), and the medium diameter of the second dispersing media used for dispersing in the next second dispersing step is preferably 0.05 mm to 0.2 mm (more preferably 0.08 mm to 0.15 mm and still more preferably 0.08 mm to 0.12 mm).

The dispersion time cannot be unconditionally determined because the optimal time thereof varies depending on the concentration of the iron oxide, the dispersant, the medium diameter, and the like. For example, it is preferable that the total dispersion time in the dispersion preparation step is 5 times to 150 times. In a case where the dispersion time is in the above-described range, the average particle diameter is 250 nm or less, the dispersion stability is improved, and the zeta potential is likely to be stably measured.

In the case of two-step dispersing, the dispersion time of the initial first dispersing step is preferably 5 hours to 120 hours, and the dispersion time of the next second dispersing step is preferably 1 hour to 80 hours. Further, the dispersion time of the initial first dispersing step is more preferably 10 hours to 70 hours, and the dispersion time of the next second dispersing step is more preferably 5 hours to 80 hours and still more preferably 30 hours to 80 hours.

In the case of single-step dispersing, the concentration of the iron oxide particles is preferably 0.1 mass % to 10 mass % and more preferably 1 mass % to 5 mass % with respect to the total amount of the iron oxide dispersion for ink jet recording.

In addition, in the case of two-step dispersing, in the initial first dispersing step, the concentration of the iron oxide particles is preferably 0.1 mass % to 20 mass %, more preferably 3 mass % to 10 mass %, and still more preferably 3 mass % to 6 mass % with respect to the total amount of the iron oxide dispersion for ink jet recording. In the next second dispersing step, the concentration of the iron oxide particles is preferably 0.1 mass % to 3 mass %, more preferably 1 mass % to 3 mass %, and still more preferably 1 mass % to 2.5 mass % with respect to the total amount of the iron oxide dispersion for ink jet recording. In order to disperse the iron oxide particles, it is more preferable that the concentration of the iron oxide particles in the second dispersing step is 3 mass % or lower.

Further, it is still more preferable that the concentration of the iron oxide particles in the first dispersing step is 3 mass % to 10 mass % with respect to the total amount of the iron oxide dispersion and the concentration of the iron oxide particles in the second dispersing step is 0.1 mass % to 3 mass % with respect to the total amount of the iron oxide dispersion.

In the case of two-step dispersing, as described above, the final average particle diameter after the two-step dispersing is 90 nm to 400 nm. In this case, the average particle diameter of the iron oxide particles before the end of the first dispersing after the start of the second dispersing is preferably 150 nm to 400 nm and more preferably 190 nm to 400 nm.

Use

The iron oxide dispersion for ink jet recording according to the present disclosure is suitably used for drawing characters or pictures on ingestible materials (for example, solid dosage forms such as tablets or capsules) such as food products or medical products. The iron oxide dispersion for ink jet recording according to the present disclosure can be used as, for example, an ink jet recording ink. In a case where characters or pictures are drawn using an ink jet method, characters or pictures can be drawn on, for example, a surface of a tablet in a non-contact manner using an ink jet recording apparatus. Therefore, recording can be stably performed irrespective of the dosage form or shape of the tablet.

Examples of the solid dosage forms include medical products such as uncoated tablets, sugar-coated tablets, enteric coated tablets, orodispersable tablets, or film coated tablets in which a water-soluble surface layer is formed on the outermost surface. In addition, examples of the solid dosage forms includes not only medical products but also compositions that are formed in the form of tablets as animal drugs, pesticides, fertilizers, or hygiene products.

In the film coated tablets, a coating layer is formed of, for example, hydroxypropyl cellulose, hydroxypropyl methyl cellulose, or polymer polyethylene glycol.

<Ink Jet Recording Method>

An ink jet recording method according to the present disclosure includes jetting the above-described iron oxide dispersion for ink jet recording using an ink jet method to record an image. Since the above-described iron oxide dispersion for ink jet recording is used, an image that exhibits a color in a range of black to brown while including the iron oxide particles as a coloring material is obtained, and jettability during jetting using an ink jet method is also excellent.

The ink jet recording method according to the present disclosure includes a step (recording step) of jetting the above-described iron oxide dispersion for ink jet recording using an ink jet method to record an image.

The ink jet method is not particularly limited and may be any one of well-known methods such as an electric charge control method of jetting ink using an electrostatic attraction force, a drop-on-demand method (pressure pulse method)

using a vibration pressure of a piezoelectric element, an acoustic ink jet method of jetting ink by converting an electrical signal into an acoustic beam and irradiating the ink with the acoustic beam, or a thermal ink jet method of heating ink to form bubbles and using a pressure generated from the bubbles.

In the present disclosure, the amount of the iron oxide dispersion for ink jet recording jetted to a target material is not particularly limited and can be appropriately selected in a range of 2 pl (picoliter; hereinafter, the same shall be applied) to 100 pl.

Examples of the target material on which an image is recorded include materials (for example, solid dosage forms such as tablets or capsules) such as food products or medical products.

In addition, in a case where the iron oxide dispersion for ink jet recording including the black iron oxide particles is jetted to a target material such as a tablet to draw characters thereon, the color can be made similar to black by increasing the density. This effect is obtained by the distance between the iron oxide particles on the target material being reduced. Examples of a method of increasing the density include a method of increasing the concentration of the black iron oxide in the iron oxide dispersion for ink jet recording, a method of increasing the amount of the iron oxide dispersion for ink jet recording jetted, and a method of recording an additional image on the initial image.

Further, in a case where the target material is a surface-coated material (for example, a tablet or a capsule), the color of an image can be made similar to black by adjusting the kind of a coating agent for coating the surface of the target material. The reason for this is that the dispersed state of the black iron oxide in the iron oxide dispersion for ink jet recording is unstabilized, and thus the iron oxide particles on the target material aggregate. Examples of a specific method of unstabilizing the dispersed state of the iron oxide particles include a method of using an anionic copolymer as a coating agent of a tablet and a method of adding a solution including a slightly alkaline material or a salt or chelating agent from which a salting-out effect is expected as a pre-treatment liquid such that the pH of liquid droplets of the iron oxide dispersion for ink jet recording jetted to the target material is 7 or higher.

After the recording step, a drying step may be further provided. Specifically, the drying step can be performed by blowing dry air, warm air, or hot air to the target material. For drying, a well-known heating means can be used.

In the ink jet recording method according to the present disclosure, a recording form is not particularly limited as long as the above-described iron oxide dispersion for ink jet recording can be jetted using an ink jet method to record an image on the target material in a non-contact manner, and a commercially available ink jet device can be used. In the ink jet recording method according to the present disclosure, an image may be recorded with an ink jet method using, for example, a tablet printing device described in JP2013-121432A.

EXAMPLES

Hereinafter, the present disclosure will be described in more detail using examples. However, the present invention is not limited to the following examples as long as it does not depart from the scope of the present disclosure. Unless specified otherwise, "part(s)" represents "part(s) by mass".

In addition, in the examples, dispersing media will be referred to as "beads".

Example 1

—Preparation of Black Iron Oxide Dispersion (Iron Oxide Dispersion for Ink Jet Recording)—

10 g of black iron oxide powder ($Fe_3O_4$; manufactured by Taketombo Co., Ltd.), 5 g of EUDRAGIT RLPO (a resin having a quaternary ammonium group; manufactured by Evonik Degussa Corporation; a copolymer of ethyl acrylate:methyl methacrylate:chlorinated trimethylammonium ethyl methacrylate=1:2:0.2 [molar ratio]), and 185 g of ion exchange water were mixed with each other to prepare a solution (mixing step), and the solution was dispersed in the following dispersion preparation step.

In the dispersion preparation step, two-step dispersing of sequentially performing a first dispersing step and a second dispersing step was performed.

Specifically, first, the solution was dispersed with a ball mill using 450 g of zirconia beads (first dispersing media) having a bead diameter $\phi$ of 1 mm under conditions of container rotation speed (the rotation speed of an outer edge portion of the container): 160 rpm and dispersion time: 50 hours (first dispersing step). In this step, the concentration of the black iron oxide was 5 mass %.

Next, the zirconia beads were removed, and ion exchange water was added such that the concentration of the black iron oxide was 2 mass %. The final content of the ion exchange water was 485 g.

Next, the dispersion was dispersed again with a ball mill using 450 g of zirconia beads (second dispersing media) having a bead diameter $\phi$ of 0.1 mm under conditions of container rotation speed: 160 rpm and dispersion time: 20 hours (second dispersing step). Next, the zirconia beads were removed.

This way, a dispersion including the black iron oxide was prepared.

—Measurement and Evaluation—

Regarding the prepared dispersion, the following measurement and evaluation were performed. The results of the measurement and evaluation are shown in Table 1 below.

(1) Physical Properties of Dispersion

Regarding the prepared dispersion, an average particle diameter and a zeta potential were obtained using the following method.

[A. Average Particle Diameter]

The prepared dispersion was diluted to 100 times with ion exchange water to obtain a dilute solution, and an average particle diameter (Z-Average (d.nm); average cumulant diameter) of the dilute solution was obtained using ZETASIZER NANO ZS (manufactured by Spectris) as the average cumulant diameter as described above.

[B. Zeta Potential]

The prepared dispersion was diluted with ion exchange water such that the concentration of the black iron oxide was 0.001 mass %, and the pH of the dilute solution was adjusted to 5 using acetic acid. Using ZETASIZER NANO ZS (manufactured by Spectris), a zeta potential $\xi$ (mV) was obtained while maintaining the liquid temperature at 25° C.

(2) Dispersion Stability

The prepared dispersion was stored in an environment of 23° C. for 7 days and was diluted to 100 times with ion exchange water to obtain a dilute solution. Using ZETASIZER NANO ZS (manufactured by Spectris), an average particle diameter (Z-Average, (d.nm)) was obtained as described above using a dynamic light scattering method.

Using a change in the average particle diameter before and after the storage as an index, the absolute value of a difference between an average molecular weight before the storage and an average molecular weight after the storage was calculated, and dispersion stability was evaluated based on the calculated value according to the following evaluation standards.

<Evaluation Standards>

A: the absolute value of the difference between the average particle diameters before and after the storage was less than 10 nm.

B: the absolute value of the difference between the average particle diameters before and after the storage was 10 nm or more and less than 50 nm.

C: the absolute value of the difference between the average particle diameters before and after the storage was 50 nm or more and less than 100 nm.

D: the absolute value of the difference between the average particle diameters before and after the storage was 100 nm or more.

(3) Color

The prepared dispersion was observed by visual inspection. Further, the dispersion was applied to paper (KASSAI, manufactured by Fuji Film Co., Ltd.) to form a coating film having a thickness of 6 μm thereon, a chromaticity (L*a*b* color space) of the coating film was measured using X-Rite T-530 (manufactured by X-rite Inc.) was measured, and the color was evaluated according to the following evaluation standards. Among the evaluation standards, A and B are in a practically allowable range.

<Evaluation Standards>

A: a color in a range of black to dark brown (a*: 0 or higher and lower than 15 and b*: 0 or higher and lower than 15)

B: brown (a*: 15 or higher and lower than 30 and b*: 0 or higher and lower than 50; or a: 0 or higher and lower than 15 and b*: 15 or higher and lower than 50)

C: a color in a range of reddish brown to red (a*: 30 or higher; or b*: 50 or higher)

(4) Ink Jettability

Components in the following composition were added to the black iron oxide dispersion to prepare an ink.

A Dimatix material printer DMP-2831 (manufactured by Fujifilm Global Graphic Systems Co., Ltd.; drop-on-demand piezoelectric method; number of nozzles: 16) was filled with the prepared ink, the ink was jetted from the 16 jetting nozzles for 1 minute (amount of liquid droplets=1 pl), the jetting was temporarily stopped, and cleaning was performed. Immediately after cleaning, the ink was jetted again from all the jetting nozzles. At this time, jettability after cleaning was evaluated according to the following evaluation standards. Here, cleaning is an operation of removing foreign matter from the jetting nozzles by pressure purging after jetting to wipe out the nozzle portions.

| <Ink Composition> | | |
|---|---|---|
| Glycerin | . . . | 10 mass % |
| Polyethylene glycol (manufactured by Sanyo Chemical Industries Ltd., molecular weight: 6000) | . . . | 3 mass % |

| <Ink Composition> | | |
|---|---|---|
| Black iron oxide. . . | | 1 mass % |
| Ion exchange water | . . . | an amount adjusted such that the total amount of the composition was 100 mass % |

<Evaluation Standards>

A: when the ink was jetted again after cleaning, the ink was jetted from 8 or more jetting nozzles among the 16 jetting nozzles, and jetting was able to be continuously performed for 1 minute or longer.

B: when the ink was jetted again after cleaning, the ink was jetted from 8 or more jetting nozzles among the 16 jetting nozzles, but jetting was able to be continuously performed for shorter than 1 minute. Next, jetting was not recovered even after repeating cleaning, and was also not recovered even after increasing the voltage.

C: when the ink was jetted again after cleaning, the number of jetting nozzles capable of jetting the ink among the 16 jetting nozzles was 3 to 7. Next, jetting was not recovered even after repeating cleaning, and was also not recovered even after increasing the voltage.

D: when the ink was jetted again after cleaning, the number of jetting nozzles capable of jetting the ink among the 16 jetting nozzles was 2 or less.

Example 2

A dispersion including the black iron oxide was prepared using the same method as in Example 1, except that the dispersion preparation step was performed by performing single-step dispersing instead of the two-step dispersing including the first dispersing step and the second dispersing step. Using the prepared dispersion, the same measurement and evaluation as in Example 1 were performed.

Specifically, the dispersion was dispersed by single-step dispersing with the same ball mill as in Example 1 using zirconia beads having a bead diameter ϕ of 1 mm under conditions of container rotation speed: 160 rpm and dispersion time: 50 hours. As a result, a black iron oxide dispersion was obtained. In this step, the concentration of the black iron oxide was 5 mass %. Next, the zirconia beads were removed, and ion exchange water was added such that the concentration of the black iron oxide was 2 mass %.

The results of the measurement and evaluation are shown in Table 1 below.

Example 3, Comparative Examples 1 to 3

Dispersions including the black iron oxide were prepared using the same method as in Example 1, except that a resin or a dispersant shown in Table 1 (EUDRAGIT RSPO, EUDRAGIT L100, sodium oleate, or alkali-treated gelatin) was used instead of EUDRAGIT RLPO used as the resin and the content thereof was changed as shown Table 1. Using the prepared dispersions, the same measurement and evaluation as in Example 1 were performed. The results of the measurement and evaluation are shown in Table 1 below.

Example 4

A dispersion including the black iron oxide was prepared using the same method as in Example 1, except that the dispersion time of the first dispersing step was changed from 50 hours to 60 hours and the dispersion time of the second dispersing step was changed from 20 hours to 60 hours.

Using the prepared dispersion, the same measurement and evaluation as in Example 1 were performed. The results of the measurement and evaluation are shown in Table 1 below.

Comparative Example 4

A dispersion including the black iron oxide was prepared using the same method as in Example 2, except that the dispersion time for obtaining the black iron oxide dispersion by the single-step dispersing was changed from 50 hours to 5 hours. Using this dispersion, the same measurement and evaluation as in Example 1 were performed. The results of the measurement and evaluation are shown in Table 1 below.

Comparative Example 5

A dispersion including the black iron oxide was prepared using the same method as in Example 4, except that the second dispersing media used in the second dispersing step (zirconia beads having a bead diameter $\phi$ of 0.1 mm) were changed to zirconia beads having a bead diameter $\phi$ of 0.05 mm. Using this dispersion, the same measurement and evaluation as in Example 4 were performed. The results of the measurement and evaluation are shown in Table 1 below.

Comparative Example 6

A dispersion including the black iron oxide was prepared using the same method as in Example 1, except that the amount of EUDRAGIT RLPO used as the resin was changed as shown in Table 1. Using the prepared dispersion, the same measurement and evaluation as in Example 1 were performed. The results of the measurement and evaluation are shown in Table 1 below.

Examples 5 to 7

Dispersions including the black iron oxide were prepared using the same method as in Example 4, except that the amount of EUDRAGIT RLPO used as the resin was changed as shown in Table 1. Using the prepared dispersions, the same measurement and evaluation as in Example 4 were performed. The results of the measurement and evaluation are shown in Table 1 below.

Example 8

—Preparation of Black Iron Oxide Dispersion (Iron Oxide Dispersion for Ink Jet Recording)—

5 g of black iron oxide powder ($Fe_3O_4$; manufactured by Taketombo Co., Ltd.), 2.5 g of EUDRAGIT RLPO (a resin having a quaternary ammonium group; manufactured by Evonik Degussa Corporation; a copolymer of ethyl acrylate: methyl methacrylate:chlorinated trimethylammonium ethyl methacrylate=1:2:0.2 [molar ratio]), and 192.5 g of ion exchange water were mixed with each other to prepare a solution (mixing step), and the solution was dispersed in the following dispersion preparation step.

In the dispersion preparation step, two-step dispersing of sequentially performing a first dispersing step and a second dispersing step was performed.

Specifically, first, the solution was dispersed with a ball mill using 450 g of zirconia beads (first dispersing media) having a bead diameter $\phi$ of 1 mm under conditions of container rotation speed (the rotation speed of an outer edge portion): 160 rpm and dispersion time: 60 hours (first dispersing step). In this step, the concentration of the black iron oxide was 2.5 mass %.

Next, the zirconia beads were removed, and ion exchange water was added such that the concentration of the black iron oxide was 1 mass %.

Next, 500 g of the dispersion was separated and was dispersed again with a ball mill using 450 g of zirconia beads (second dispersing media) having a bead diameter $\phi$ of 0.1 mm under conditions of container rotation speed: 160 rpm and dispersion time: 60 hours (second dispersing step). Next, the zirconia beads were removed.

This way, a black iron oxide dispersion was prepared. Using the prepared dispersion, the same measurement and evaluation as in Example 1 were performed. The results of the measurement and evaluation are shown in Table 1 below.

"(4) Ink Jettability" was evaluated using the same method as in Example 1, except that the ink composition was changed to the following composition.

| <Ink Composition of Example 8> | | |
|---|---|---|
| Glycerin | . . . | 10 mass % |
| Polyethylene glycol (manufactured by Sanyo Chemical Industries Ltd., molecular weight: 6000) | . . . | 3.0 mass % |
| Black iron oxide | . . . | 0.5 mass % |
| Ion exchange water | . . . | an amount adjusted such that the total amount of the composition was 100 mass % |

Example 9

—Preparation of Black Iron Oxide Dispersion (Iron Oxide Dispersion for Ink Jet Recording)—

2.5 g of alkali-treated gelatin, 0.5 g of sodium oleate, and 492 g of ion exchange water were mixed with each other to prepare a solution (mixing step), and the prepared solution was heated to 40° C. and completely dissolved. Further, 5 g of black iron oxide powder ($Fe_3O_4$; manufactured by Taketombo Co., Ltd.) was added to the solution, and the solution was dispersed in the following dispersion preparation step.

In the dispersion preparation step, two-step dispersing of sequentially performing a first dispersing step and a second dispersing step was performed.

Specifically, first, the solution was dispersed with a ball mill using 450 g of zirconia beads (first dispersing media) having a bead diameter $\phi$ of 1 mm under conditions of container rotation speed (the rotation speed of an outer edge portion): 160 rpm and dispersion time: 50 hours (first dispersing step). In this step, the concentration of the black iron oxide was 1 mass %.

Next, the zirconia beads were removed. Next, the dispersion was dispersed again with a ball mill using 450 g of zirconia beads (second dispersing media) having a bead diameter $\phi$ of 0.1 mm under conditions of container rotation speed: 160 rpm and dispersion time: 60 hours (second dispersing step). Next, the zirconia beads were removed.

This way, a black iron oxide dispersion was prepared. Using the prepared dispersion, the same measurement and evaluation as in Example 1 were performed. The results of the measurement and evaluation are shown in Table 1 below.

"(4) Ink Jettability" was evaluated using the same method as in Example 1, except that the ink composition was changed to the following composition.

<Ink Composition of Example 9>

| | | |
|---|---|---|
| Glycerin | ... | 10 mass % |
| Polyethylene glycol (manufactured by Sanyo Chemical | ... | 3.0 mass % |

<Ink Composition of Example 9> -continued

| | | |
|---|---|---|
| Industries Ltd., molecular weight: 6000) | | |
| Black iron oxide | ... | 0.5 mass % |
| Ion exchange water | ... | an amount adjusted such that the total amount of the composition was 100 mass % |

TABLE 1

| | | Example 1 | Example 2 | Example 3 | Comparative Example 1 | Comparative Example 2 | Comparative Example 3 | Example 4 | Comparative Example 4 |
|---|---|---|---|---|---|---|---|---|---|
| Dispersion Composition | Black Iron Oxide Particles [mass %] | 2 | 2 | 2 | 2 | 2 | 2 | 2 | 2 |
| | EUDRAGIT RLPO (Dispersion Resin having Quaternary Ammonium Group) [mass %] | 1 | 1 | — | — | — | — | 1 | 1 |
| | EUDRAGIT RSPO (Dispersion Resin having Quaternary Ammonium Group) [mass %] | — | — | 1 | — | — | — | — | — |
| | EUDRAGIT L100 (Dispersion Resin having Amino Group) [mass %] | — | — | — | 1 | — | — | — | — |
| | Sodium Oleate (Unsaturated Fatty Acid Dispersant) [mass %] | — | — | — | — | 0.05 | 0.05 | — | — |
| | Alkali-Treated Gelatin (Dispersion Resin having Amino Group) [mass %] | — | — | — | — | — | 1 | — | — |
| | Water [mass %] | 97.0 | 97.0 | 97.0 | 97.0 | 98.0 | 97.0 | 97.0 | 97.0 |
| | A/B (Content of Dispersion Resin/Content of Iron Oxide Particles) | 0.5 | 0.5 | 0.5 | 0.5 | 0.05 | 0.55 | 0.5 | 0.5 |
| | Average Particle diameter Z-Ave. [d · nm] | 165 | 250 | 180 | 600 | Not Dispersible | 1200 | 130 | 900 |
| | Zeta Potential [mv] | 35 | 25 | 30 | Not Measureable | Not Measureable | Not Measureable | 40 | Not Measureable |
| Dispersing Method | Dispersion Method | Second-Step Dispersing | Single-Step Dispersing | Second-Step Dispersing | Second-Step Dispersing | Second-Step Dispersing | Second-Step Dispersing | Second-Step Dispersing | Single-Step Dispersing |
| | Bead Diameter [mm] First Dispersing (First Bead Diameter) | 1 | 1 | 1 | 1 | 1 | 1 | 1 | 1 |
| | Second Dispersing (Second Bead Diameter) | 0.1 | — | 0.1 | 0.1 | 0.1 | 0.1 | 0.1 | — |
| | Dispersion Time [hours] First Dispersing (First Dispersing Step) | 50 | 50 | 50 | 50 | 50 | 50 | 60 | 5 |
| | Second Dispersing (Second Dispersing Step) | 20 | — | 20 | 20 | 20 | 20 | 60 | — |
| Evaluation | Dispersion Stability (after 7 Days) | B | B | B | D | D | D | A | D |
| | Color of Dispersion | B | A | B | A | A | A | B | A |
| | Ink Jettability | B | C | B | D | D | D | A | D |

TABLE 1-continued

|  |  | Comparative Example 5 | Comparative Example 6 | Example 5 | Example 6 | Example 7 | Example 8 | Example 9 |
|---|---|---|---|---|---|---|---|---|
| Dispersion Composition | Black Iron Oxide Particles [mass %] | 2 | 2 | 2 | 2 | 2 | 1 | 1 |
|  | EUDRAGIT RLPO (Dispersion Resin having Quaternary Ammonium Group) [mass %] | 1 | 0.4 | 0.6 | 1.5 | 2 | 0.5 | — |
|  | EUDRAGIT RSPO (Dispersion Resin having Quaternary Ammonium Group) [mass %] | — | — | — | — | — | — | — |
|  | EUDRAGIT L100 (Dispersion Resin having Amino Group) [mass %] | — | — | — | — | — | — | — |
|  | Sodium Oleate (Unsaturated Fatty Acid Dispersant) [mass %] | — | — | — | — | — | — | 0.05 |
|  | Alkali-Treated Gelatin (Dispersion Resin having Amino Group) [mass %] | — | — | — | — | — | — | 0.5 |
|  | Water [mass %] | 97.0 | 97.6 | 97.4 | 96.5 | 96.0 | 98.5 | 98.5 |
|  | A/B (Content of Dispersion Resin/Content of Iron Oxide Particles) | 0.5 | 0.2 | 0.3 | 0.8 | 1.0 | 0.5 | 0.5 |
|  | Average Particle diameter Z-Ave. [d · nm] | 60 | 420 | 220 | 165 | 250 | 125 | 350 |
|  | Zeta Potential [mv] | 50 | 20 | 27 | 30 | 25 | 40 | 5 |
| Dispersing Method | Dispersion Method | Second-Step Dispersing | Second-Step Dispersing | Second-Step Dispersing | Second-Step Dispersing | Second-Step Dispersing | Second-Step Dispersing | Second-Step Dispersing |
|  | Bead Diameter [mm] First Dispersing (First Bead Diameter) | 1 | 1 | 1 | 1 | 1 | 1 | 1 |
|  | Second Dispersing (Second Bead Diameter) | 0.05 | 0.1 | 0.1 | 0.1 | 0.1 | 0.1 | 0.1 |
|  | Dispersion Time [hours] First Dispersing (First Dispersing Step) | 60 | 60 | 60 | 60 | 60 | 60 | 50 |
|  | Second Dispersing (Second Dispersing Step) | 60 | 60 | 60 | 60 | 60 | 60 | 60 |
| Evaluation | Dispersion Stability (after 7 Days) | A | D | B | B | B | A | C |
|  | Color of Dispersion | C | A | A | B | A | B | A |
|  | Ink Jettability | A | C | B | B | C | A | C |

The components shown in Table 1 will be described below in detail. In Table 1, the symbol "-" represents that the component is not included.

EUDRAGIT RLPO (manufactured by Evonik Degussa Corporation; a copolymer of ethyl acrylate/methyl methacrylate/chlorinated trimethylammonium ethyl methacrylate (=1/2/0.2 [molar ratio]); a resin having a quaternary ammonium group)

EUDRAGIT RSPO (manufactured by Evonik Degussa Corporation; a copolymer of ethyl acrylate/methyl methacrylate/chlorinated trimethylammonium ethyl methacrylate (=1/2/0.1 [molar ratio]); a resin having a quaternary ammonium group)

EUDRAGIT L100 (manufactured by Evonik Degussa Corporation, a copolymer of methacrylic acid/methyl methacrylate (=1/1 [molar ratio]); a resin not having an amino group)

Sodium oleate (manufactured by Tokyo Chemical Industry Co., Ltd.)

Alkali-treated gelatin derived from cattle bones (jelly strength: 112, isoelectric point: 5.1; manufactured by Nitta Gelatin Inc.; a resin having an amino group)

The solubility of EUDRAGIT RLPO, EUDRAGIT RSPO, and EUDRAGIT L100 in 100 g of water at 40° C. was 1 g or lower. The solubility of alkali-treated gelatin and sodium oleate in 100 g of water at 40° C. was higher than 5 g.

As shown in Table 1, in Examples, excellent dispersion stability was obtained as compared to Comparative Examples. In addition, excellent jettability during jetting using an ink jet method was exhibited while maintaining the color in a range of black to brown. In particular, in Example 4 in which the dispersion time was increased to improve dispersibility, a color change caused by a small average particle diameter occurred, but a dispersion having excellent dispersion stability and ink jettability was able to be obtained while maintaining the excellent color. Therefore, as in the case of Examples 5 to 7, the particle diameter (average particle diameter; hereinafter, the same shall be applied) of the dispersed particle suitable for maintaining the color was maintained, and the amount of the resin was able to be reduced while preventing dispersion stability and ink jettability from significantly deteriorating.

Focusing the dispersing method, as can be seen from the results of Examples 1 and 2, in the case of the single-step dispersing, the particle diameter of the dispersed particle was more than that of the two-step dispersing. Therefore, in the case of the single-step dispersing, a color similar to black was obtained, but ink jet suitability was poor. In the case of the two-step dispersing, a dispersion having excellent jettability was able to be obtained.

In a case where the dispersion time was excessively short as in Comparative Example 4, the particle diameter of the dispersed particle suitable for maintaining the color in a range of black to brown was not obtained. As a result, dispersion stability and ink jettability were poor.

Focusing on the dispersant, in Comparative Example 1 in which the dispersant not including an amino group and a quaternary ammonium group was used, the iron oxide particles were insufficiently dispersed, and only a dispersion in which the particle diameter of the dispersed particle was large was able to be obtained. As a result, in Comparative Example 1, the dispersion stability of the iron oxide particles was poorer, and ink jettability was also poorer than those of Example 1. Further, a potential value was not stable, and it was difficult to measure the zeta potential.

In addition, the cases where sodium oleate generally known as a dispersant was used will be described. In Comparative Example 2, dispersing was not able to be performed. In Comparative Example 3, a dispersion in which the particle diameter of the dispersed particles was relatively favorable was obtained by using sodium oleate in combination with gelatin, but dispersion stability was poor and ink jettability was also significantly poor. Further, a potential value was not stable, and it was difficult to measure the zeta potential.

Here, by adjusting the composition of the dispersion and the dispersion time as in Example 9, a dispersion in which the particle diameter of the dispersed particles was relatively favorable was able to be obtained, and dispersion stability and ink jettability were able to be maintained to some extent. However, in the composition in which gelatin was used, the zeta potential of the dispersed particles was low.

Next, in a case where the bead diameter of the beads used in the second dispersing step was small as in Comparative Example 5, the particle diameter of the dispersed particle was less than 90 nm, and the color was not able to be maintained in a range of black to brown.

In addition, by changing the amount of the dispersant as in Comparative Example 6, the dispersed state was able to be changed. However, in a case where the amount of the dispersant was excessively small, the particle diameter was not sufficiently reduced by dispersing, the average particle diameter exceeded 400 nm, and dispersion stability was poor.

As described above, by dispersing the iron oxide particles that exhibits black using the specific dispersant to be in the specific dispersed state, a good balance between dispersion stability, color, and jettability during jetting using an ink jet method was able to be obtained.

The disclosure of Japanese Patent Application No. 2015-195138 filed on Sep. 30, 2015 is incorporated herein in its entirety. All publications, patent applications, and technical standards mentioned in this specification are herein incorporated by reference to the same extent as if each individual publication, patent application, or technical standard was specifically and individually indicated to be incorporated by reference. The foregoing description with regard to the exemplary embodiments of the present disclosure is for the purpose of illustration and explanation, and is not intended to be exhaustive or limit the invention to the precise forms disclosed. Although it is clear, it is appreciated by those skilled in the art that many changes may be made in these embodiments without departing from the principles and spirit of the invention. The embodiments described above are selected in order to best explain the principles of the invention and practical applications, to provide various embodiments applicable to particular uses estimated or various modifications, and to aid those skilled in other arts in understanding the invention. It is intended that the scope of the present disclosure is defined in the appended claims and their equivalents.

What is claimed is:

1. An iron oxide dispersion for ink jet recording comprising:
   iron oxide particles;
   a resin that has at least one of an amino group or a quaternary ammonium group and coats at least a part of surfaces of the iron oxide particles; and
   water,
   wherein an average particle diameter of the iron oxide particles having surfaces at least a part of which are coated with the resin is 90 nm to 400 nm, and
   wherein a zeta potential of the iron oxide particles having surfaces at least a part of which are coated with the resin is from 20 mV to 50 mV, under conditions of pH 5 and 25° C.

2. The iron oxide dispersion for ink jet recording according to claim 1,
   wherein the resin is a copolymer.

3. The iron oxide dispersion for ink jet recording according to claim 1,
   wherein the resin is an alkyl (meth)acrylate copolymer having a quaternary ammonium group.

4. The iron oxide dispersion for ink jet recording according to claim 3,
   wherein an average particle diameter of the iron oxide particles having surfaces at least a part of which are coated with the resin is 90 nm to 280 nm.

5. The iron oxide dispersion for ink jet recording according to claim 3,
   wherein an iron oxide of the iron oxide particles is iron(II,III) oxide.

6. The iron oxide dispersion for ink jet recording according to claim 1,
   wherein an average particle diameter of the iron oxide particles having surfaces at least a part of which are coated with the resin is 90 nm to 280 nm.

7. The iron oxide dispersion for ink jet recording according to claim 1,
   wherein an average particle diameter of the iron oxide particles having surfaces at least a part of which are coated with the resin is 100 nm to 200 nm.

8. The iron oxide dispersion for ink jet recording according to claim 1,
   wherein an iron oxide of the iron oxide particles is iron(II,III) oxide.

9. The iron oxide dispersion for ink jet recording according to claim 1,
wherein a content of $Fe_3O_4$ is 50 mass % or higher with respect to the total amount of the iron oxide.

10. The iron oxide dispersion for ink jet recording according to claim 1,
wherein the resin includes a structural unit derived from at least one monomer selected from the group consisting of methyl (meth)acrylate and ethyl (meth)acrylate and a structural unit derived from chlorinated trimethylammoniumethyl (meth)acrylate.

11. The iron oxide dispersion for ink jet recording according to claim 1,
wherein a mass ratio of a content A of the resin to a content B of the iron oxide particles is in a range that satisfies the following Expression 1, $$0.3 \leq A/B \leq 0.8 \qquad \text{Expression 1.}$$

12. The iron oxide dispersion for ink jet recording according to claim 1,
wherein a mass ratio of a content A of the resin to a content B of the iron oxide particles is in a range that satisfies the following Expression 2, $$0.3 \leq A/B \leq 0.7 \qquad \text{Expression 2.}$$

13. The iron oxide dispersion for ink jet recording according to claim 1,
wherein a mass ratio of a content A of the resin to a content B of the iron oxide particles is in a range that satisfies the following Expression 3, $$0.4 \leq A/B \leq 0.6 \qquad \text{Expression 3.}$$

14. An ink jet recording method comprising:
jetting the iron oxide dispersion for ink jet recording according to claim 1 using an ink jet method to record an image.

15. A method of manufacturing an iron oxide dispersion for ink jet recording, the method comprising:
a mixing step of mixing iron oxide particles, a resin that has at least one of an amino group or a quaternary ammonium group, and water with each other; and
a dispersion preparation step of dispersing the iron oxide particles in water in the presence of the resin to prepare an iron oxide dispersion in which iron oxide particles having surfaces at least a part of which are coated with the resin and having an average particle diameter of 90 nm to 400 nm are dispersed, and wherein a zeta potential of the iron oxide particles having surfaces at least a part of which are coated with the resin is from 20 mV to 50 mV, under conditions of pH 5 and 25° C.

16. The method of manufacturing an iron oxide dispersion for ink jet recording according to claim 15,
wherein the dispersion preparation step includes a first dispersing step of dispersing the iron oxide particles in water using first dispersing media and a second dispersing step of further dispersing the iron oxide particles dispersed in the first dispersing step using second dispersing media having a smaller medium diameter than the first dispersing media.

17. The method of manufacturing an iron oxide dispersion for ink jet recording according to claim 16,
wherein a ratio of the medium diameter of the first dispersing media to the medium diameter of the second dispersing media is 5 times to 50 times.

* * * * *